(12) United States Patent
Chen et al.

(10) Patent No.: US 12,003,868 B2
(45) Date of Patent: Jun. 4, 2024

(54) IMAGING SYSTEM AND IMAGING METHOD THEREOF

(71) Applicant: Shenzhen Technology University, Guangdong (CN)

(72) Inventors: Gengliang Chen, Guangdong (CN); Ye Gu, Guangdong (CN); Guanwei Lu, Guangdong (CN)

(73) Assignee: Shenzhen Technology University, Shenzhen (CN)

( * ) Notice: Subject to any disclaimer, the term of this patent is extended or adjusted under 35 U.S.C. 154(b) by 74 days.

(21) Appl. No.: 17/640,993

(22) PCT Filed: Mar. 16, 2021

(86) PCT No.: PCT/CN2021/080923
§ 371 (c)(1),
(2) Date: Mar. 7, 2022

(87) PCT Pub. No.: WO2022/147901
PCT Pub. Date: Jul. 14, 2022

(65) Prior Publication Data
US 2022/0264033 A1   Aug. 18, 2022

(30) Foreign Application Priority Data
Jan. 6, 2021 (CN) .......................... 202110013690.4

(51) Int. Cl.
*H04N 25/44* (2023.01)
*H04N 23/56* (2023.01)
(Continued)

(52) U.S. Cl.
CPC ............. *H04N 25/44* (2023.01); *H04N 23/56* (2023.01); *H04N 25/60* (2023.01); *H04N 25/75* (2023.01)

(58) Field of Classification Search
CPC ........ H04N 23/56; H04N 25/44; H04N 25/60; H04N 25/75; G01N 21/8806; G01N 21/8851
See application file for complete search history.

(56) References Cited

U.S. PATENT DOCUMENTS

| | | | |
|---|---|---|---|
| 6,377,346 B1 * | 4/2002 | Vaisala | G01J 3/08 356/417 |
| 2004/0001149 A1 * | 1/2004 | Smith | H04N 23/00 348/E7.086 |

(Continued)

FOREIGN PATENT DOCUMENTS

| | | |
|---|---|---|
| CN | 201382905 | 1/2010 |
| CN | 104267407 | 1/2015 |

(Continued)

OTHER PUBLICATIONS

International Search Report (see translation)—dated Aug. 26, 2021 PCT/CN2021/080923.

(Continued)

*Primary Examiner* — Lin Ye
*Assistant Examiner* — Chriss S Yoder, III
(74) *Attorney, Agent, or Firm* — Notaro, Michalos & Zaccaria P.C.; John S. Economou

(57) ABSTRACT

Disclosed are an imaging system and an imaging method thereof. The system includes a light source, a light source modulator, an objective lens, a sensor array, a sensor read-write module and an imaging display module connected with the sensor read-write module. The light source modulator is configured for modulating the light source to a preset frequency; the objective lens is configured for imaging an optical signal reflected by a surface of a target object on the sensor array; the sensor array is configured for converting the received optical signal into an analog alternating current electrical signal; the sensor read-write module is configured (Continued)

for amplifying the analog alternating current electrical signal and extracting a target signal, converting the target signal into a digital signal and storing the digital signal; and the imaging display module is configured for restoring and displaying an image of the target object according to the digital signal.

9 Claims, 3 Drawing Sheets

(51) Int. Cl.
    *H04N 25/60*     (2023.01)
    *H04N 25/75*     (2023.01)

(56) References Cited

U.S. PATENT DOCUMENTS

2018/0302542 A1* 10/2018 Masumura ........ G02F 1/136277
2020/0241136 A1* 7/2020 Pang .................... B60Q 1/1407

FOREIGN PATENT DOCUMENTS

| | | | | |
|---|---|---|---|---|
| CN | 104345318 | | 2/2015 | |
| CN | 105807289 | | 7/2016 | |
| CN | 108363069 | | 8/2018 | |
| CN | 108551541 | | 9/2018 | |
| CN | 208314317 U | | 1/2019 | |
| CN | 108551541 B | * | 9/2019 | ............... H01S 3/10 |
| CN | 111443358 | | 7/2020 | |
| CN | 111856502 | | 10/2020 | |
| JP | H1130590 A | | 2/1999 | |
| WO | 2013058167 A1 | | 4/2013 | |

OTHER PUBLICATIONS

Written Opinion of the International Search Authority (see translation)—dated Aug. 26, 2021 PCT/CN2021/080923.
Office Action in Chinese priority application (see translation)—dated Sep. 30, 2021 CN 20210013690.4.

* cited by examiner

IMAGING SYSTEM AND IMAGING METHOD THEREOF

CROSS-REFERENCE TO RELATED APPLICATIONS

This application is a national stage filing under 35 U.S.C. § 371 of international application number PCT/CN2021/080923, filed Mar. 16, 2021, which claims priority to Chinese patent application No. 2021100136904 filed Jan. 6, 2021. The contents of these applications are incorporated herein by reference in their entirety.

TECHNICAL FIELD

The disclosure relates to the technical field of electronic imaging, and, more particularly, to an imaging system and an imaging method thereof.

BACKGROUND

Optical images are widely used in an automatic inspection process of the manufacturing industry, such as the defect inspection of printed circuit boards and flat-panel displays. An image detection process is as follows: a surface of a target object is irradiated by a light source, an image of the target object is captured by an optical camera, then defects on the surface of the target object are detected by image recognition and image processing, and the defects are expressed by a display or auto-marking, thereby improving the yield rate of products.

However, the imaging principle of traditional optical cameras is to measure a direct current signal generated by a sensor array and generate an image according to the direct current signal. For the traditional optical cameras, the effects are not ideal when imaging a surface in a weak light field, which is easily subjected to interference by external environmental factors and has limited signal-to-noise ratio, so the imaging quality needs to be improved. For example there is a reflective surface on the imaging surface, the camera sensor array will be supersaturated or the object surface cannot be photographed due to specular reflection. For another example, the imaging surface has a certain degree of transparency, resulting in a week signal on the imaging surface due to optical penetration. For yet another example, the image surface is relatively dark, resulting in a low imaging resolution due to light absorption characteristic of the surface.

SUMMARY

In light of this, the object of the embodiments of the disclosure is to provide an imaging system and an imaging method thereof, the imaging system can reduce the influence of external ambient light on a target object and improve a signal-to-noise ratio, thereby improving an imaging quality.

In a first aspect, embodiments of the disclosure provide an imaging system, including a light source, a light source modulator, an objective lens, a sensor array, a sensor read-write module and an imaging display module connected with the sensor read-write module;

the light source modulator is configured for modulating the light source to a preset frequency;

the objective lens is configured for imaging an optical signal reflected by a surface of a target object on the sensor array;

the sensor array is configured for converting the received optical signal into an analog alternating current electrical signal;

the sensor read-write module is configured for amplifying the analog alternating current electrical signal and extracting a target signal, converting the target signal into a digital signal and storing the digital signal; and the imaging display module is configured for restoring and displaying an image of the target object according to the digital signal.

Optionally, the light source is a common light source, and the light source modulator is a mechanical chopper.

Optionally, the light source is a laser light source, and the light source modulator is a light source electrical controller.

Optionally, the light source is a polarized light source, and the light source modulator is an electro-optical modulator.

Optionally, the sensor read-write module includes a signal buffer unit, a phase sensitive detection unit, a high-pass filter unit and a high-speed analog-to-digital converter unit, the sensor array is connected with the high-speed analog-to-digital converter unit via the signal buffer unit, the phase sensitive detection unit and the high-pass filter unit sequentially, input signal of the phase sensitive detection unit further includes a reference signal with a frequency identical to the preset frequency.

Optionally, the light source includes a first light source and a second light source, and the system further includes a first lens, a second lens, a third lens and a dichroic mirror; and the first light source modulated by a first preset frequency and the second light source modulated by a second preset frequency respectively transmit through the first lens and the second lens and then transmit through the dichroic mirror to form coupled light, and the coupled light transmitting through the third lens is used for irradiating the surface of the target object.

In a second aspect, the embodiments of the disclosure provide an imaging method of the imaging system mentioned above, including the following steps of:

irradiating the light source modulated by the light source modulator onto the surface of the target object;

reading, by the sensor read-write module, an analog alternating current electrical signal generated by the sensor array, amplifying the analog alternating current electrical signal and extracting a target signal, and converting the target signal into a digital signal and storing the digital signal; and restoring and displaying, by the imaging display module, an image of the target object according to the digital signal.

Optionally, the method further includes a step of: setting a modulation frequency of the light source modulator to the preset frequency.

Optionally, the reading, by the sensor read-write module, the analog alternating current electrical signal generated by the sensor array, specifically includes the following steps of:

reading, by the sensor read-write module, the analog alternating current electrical signal generated by the sensor array in rows;

determining whether a preset number of rows are completely read; and if not, continuing to read a next row until the analog alternating current electrical signal of the preset number of rows is read.

Optionally, the method further includes the steps of:

modulating the first light source to the first preset frequency and modulating the second light source to the second preset frequency; and respectively transmitting the modulated first light source and the modulated second light source through the first lens and the second lens and then through the dichroic mirror to form coupled light, and transmitting the coupled light through the third lens to irradiate the surface of the target object.

Embodiments of the disclosure has the following beneficial effects. The imaging system of the embodiments of the disclosure includes the light source, the light source modulator, the objective lens, the sensor array, the sensor read-write module and the imaging display module, where the system modulates the light source to the preset frequency through the light source modulator and irradiates the modulated light source onto the surface of the target object; the optical signal diffusely reflected from the surface of the target object forms the analog alternating current signal in the sensor array after transmitting through the objective lens; the sensor read-write module amplifies the analog alternating current signal and extracts the target signal, and converts the target signal into the digital signal, and the imaging display module restores and displays the image of the target object according to the digital signal; the light source after modulated by the light source modulator irradiates the surface of the target object, then the analog alternating current signal is formed on the sensor array, and the target signal is extracted from the analog alternating current signal by the sensor read-write module, thus reducing the influence of external ambient light on the imaging of the target object.

DETAILED DESCRIPTION

The disclosure will be further described in detail below with reference to the accompany drawings and specific embodiments. For the step numbers in the following embodiments, they are only set for convenience of explanation, the order between the steps is not limited, and the execution order of each step in the embodiments may be adaptively adjusted according to the understanding of a person of ordinary skill in the art.

Figure 1:
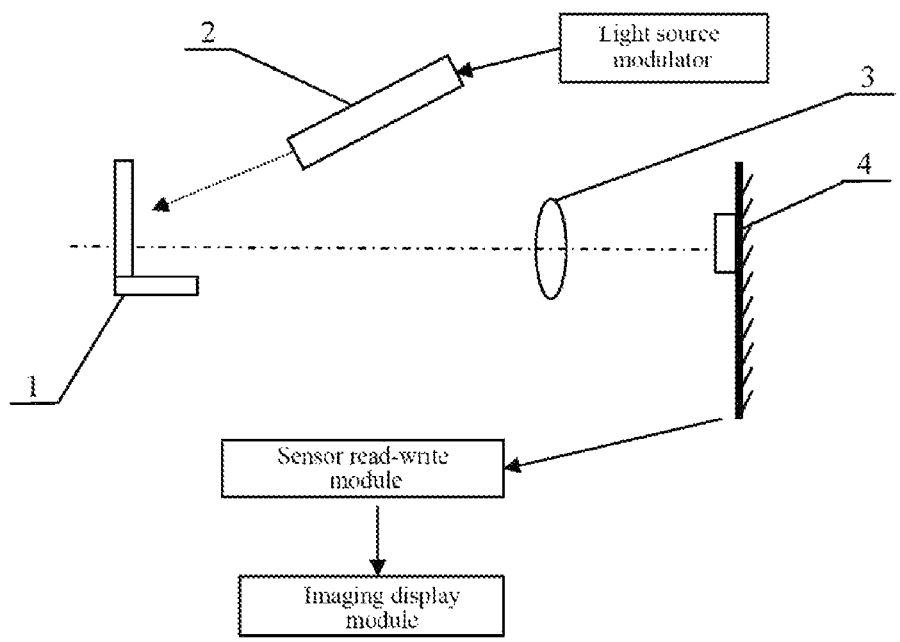
FIG. 1 is a schematic structural diagram of an imaging system provided by an embodiment of the disclosure.

As shown in FIG. 1, the embodiments of the disclosure provide an imaging system, including a target object 1, a light source 2, a light source modulator, an objective lens 3, a sensor array 4, a sensor read-write module and an imaging display module connected with the sensor read-write module;

the light source modulator is configured for modulating the light source 2 to a preset frequency;

the objective lens 3 is configured for imaging an optical signal reflected by a surface of the target object 1 on the sensor array 4;

the sensor array 4 is configured for converting the received optical signal into an analog alternating current electrical signal;

the sensor read-write module is configured for amplifying the analog alternating current electrical signal and extracting a target signal, converting the target signal into a digital signal and storing the digital signal; and the imaging display module is configured for restoring and displaying an image of the target object 1 according to the digital signal.

Operating principle of the above-mentioned system is described as follows. The light source modulator modulates the light source 2 to the preset frequency, which is generally a high frequency, such as 1 KHz, and the modulated light source irradiates on the surface of the target object 1 for generating diffuse reflection. After the light subjected to diffuse reflection passes through the objective lens 3, the light generates an analog alternating current electrical signal on the sensor array 4. The sensor read-write module amplifies the analog alternating current electrical signal and extracts the target signal, and converts the target signal into the digital signal and stores the digital signal. The imaging display module restores and displays the image of the target object 1 according to the digital signal.

It should be noted that the sensor array 4 may be a CCD array. When a CCD array camera is used to shoot the target object, the light reflected by the target object is transmitted to the CCD array through the objective lens 3 of the camera. When the CCD array is exposed, photodiodes are excited by the light to release charges and generate electrical signals. The electrical signals generated by primary imaging are collected by the CCD and uniformly output to an amplifier.

Optionally, the light source is a common light source, and the light source modulator is a mechanical chopper.

It should be noted that the rotation of the mechanical chopper controls the common light source to be periodically turned off to form an alternating current optical signal. The mechanical chopper may be a fan or other rotating mechanical structure, and an optical signal with required waveform can be customized by the mechanical chopper, such as a sine wave signal or a square wave signal. In this embodiment, the common light source may be a light source of any polarization or any wavelength.

Optionally, the light source is a laser light source, and the light source modulator is a light source electrical controller.

It should be noted that the light source electrical controller may control periodically power supply to the light source, so as to realize the modulation of the light signal, for example, controlling parameters such as a current or a voltage of the light source. In this embodiment, the output signal of the laser light source modulated by the light source electric controller may be sine wave, square wave or other customized waves.

Optionally, the light source is a polarized light source, and the light source modulator is an electro-optical modulator.

It should be noted that the light source may be a polarized light source, or a light source output by a common light source after transmitting through a polarizer. The electro-optic modulator is a modulator manufactured by using an electro-optic effect of special electro-optic crystals, such as lithium niobate crystal (LiNbO3), gallium arsenide crystal (GaAs) or lithium tantalate crystal (LiTaO3). When a voltage is applied to the electro-optic crystal, a refractive index of the electro-optic crystal will change, and characteristic of the light wave transmitting through the electro-optic crystal will also change, thus realizing the modulation of a phase, an amplitude, an intensity or a polarization state of the optical signal. In other words, the amplitude or phase of the output light is modulated by controlling the external voltage. The output signal of the polarized light source modulated by the electro-optical modulator may be sine wave, square wave or other customized waves.

Figure 2:
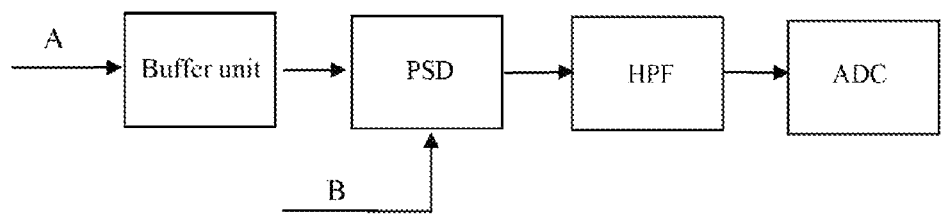
FIG. 2 is a structural block diagram of a sensor read-write module provided by an embodiment of the present application.

Optionally, as shown in FIG. 2, the sensor read-write module includes a signal buffer unit, a phase sensitive detection (PSD) unit, a high-pass filter (HPF) unit and a high-speed analog-to-digital converter (ADC) unit, the sensor array is connected with the high-speed ADC converter unit via the signal buffer unit, the phase sensitive detection unit and the high-pass filter unit sequentially. Input signal of the phase sensitive detection unit further includes a reference signal B with a frequency identical to the preset frequency.

Measured signal A output by the sensor array sequentially transmits through the signal buffer unit and then reaches the PSD, and the PSD can measure the weak input signal through a phase-locked amplification technology according to the signal A and the signal B. The input signal may be as small as several nanovolts, and can be accurately measured even in thousands of times of noise. The real signal is extracted by the high-pass filter to filter out the interference of the external direct current light source, so as to amplify the weak signal. Then the analog signal is collected by the high-speed ADC, and then an electro-optical signal converted by the modulated light is oversampled.

Figure 3:
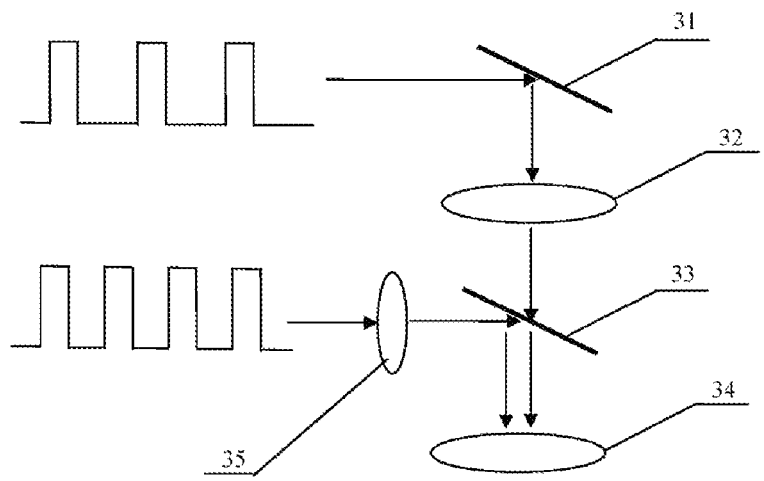
FIG. 3 is a schematic structural diagram of forming coupled light provided by an embodiment of the disclosure.

Optionally, as shown in FIG. 3, the light source includes a first light source and a second light source, and the system further includes a first lens 32, a second lens 35, a third lens 34 and a dichroic mirror 33; and may further include a reflector 31. A first light source modulated by a first preset frequency is reflected by the reflector 31 and then passes through the first lens 32 to reach the dichroic mirror 33, while a second light source modulated by a second preset frequency reaches the dichroic mirror 33 via the second lens 35. The modulated first and second light sources form coupled light at the dichroic mirror 33, and the coupled light is used to irradiate the surface of the target object after transmitting through the third lens 34.

It should be noted that both the first light source and the second light source may be modulated by the above-mentioned mechanical modulation or circuit modulation, the first preset frequency and the second preset frequency are different, and different reference frequencies are set in the sensor read-write module. Through the modulated first light source and the modulated second light source, the imaging system can recover multispectral images at one time.

Embodiments of the disclosure have the following beneficial effects. The imaging system of the embodiments of the disclosure includes the light source, the light source modulator, the objective lens, the sensor array, the sensor read-write module and the imaging display module, where the system modulates the light source to the preset frequency through the light source modulator and irradiates the modulated light source onto the surface of the target object; the optical signal diffusely reflected from the surface of the target object forms the analog alternating current signal in the sensor array after transmitting through the objective lens; the sensor read-write module amplifies the analog alternating current signal and extracts the target signal, and converts the target signal into the digital signal, and the imaging display module restores and displays the image of the target object according to the digital signal; the light source after modulated by the light source modulator irradiates on the surface of the target object, then the analog alternating current signal is formed on the sensor array, and the target signal is extracted from the analog alternating current signal by the sensor read-write module, thus reducing the influence of external ambient light on the imaging of the target object.

Figure 4:
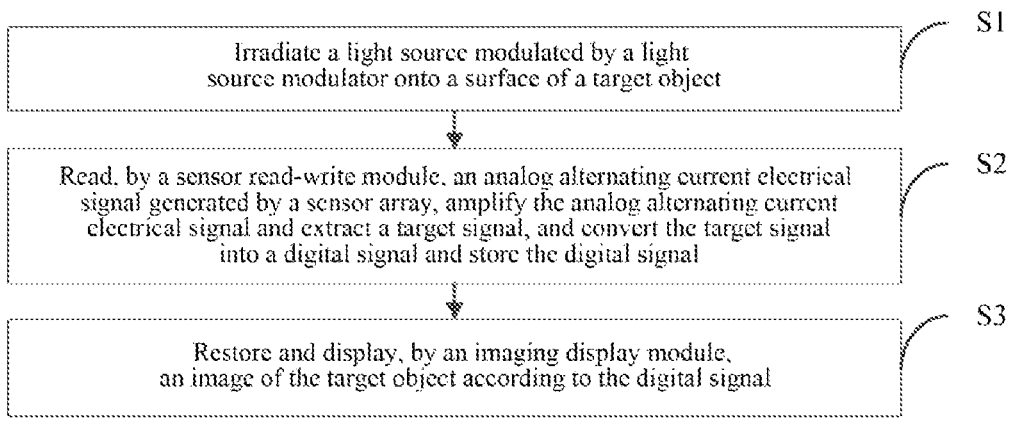
FIG. 4 is a flowchart showing steps of an imaging method provided by an embodiment of the disclosure.

As shown in FIG. 4, embodiments of the disclosure provide an imaging method of the imaging system mentioned above, including the following steps of:

S1. irradiating the light source modulated by the light source modulator onto the surface of the target object;

S2. reading, by the sensor read-write module, an analog alternating current electrical signal generated by the sensor array, amplifying the analog alternating current electrical signal and extracting a target signal, and converting the target signal into a digital signal and storing the digital signal; and S3. restoring and displaying, by the imaging display module, an image of the target object according to the digital signal.

The modulated light source is irradiated onto the surface of the target object to generate diffuse reflection. The reflected light passes through the objective lens to generate the analog alternating current electrical signal in the sensor array. The sensor read-write module reads the analog alternating current electrical signal, amplifies the analog alternating current electrical signal and extracts the target signal, and converts the target signal into the digital signal and stores the digital signal. The imaging display module restores and displays the image of the target object according to the digital signal.

It should be noted that the light source may be a single light source or double light sources, which is not specifically limited in the embodiments of the disclosure. The modulation mode of the light source modulator may be either mechanical modulation or circuit modulation, which is not specifically limited in the embodiments of the disclosure.

Optionally, the method further includes a step of: setting a modulation frequency of the light source modulator to the preset frequency.

It should be noted that the modulation frequency of the light source modulator is not limited by a control clock of the sensor array, and the modulation frequency may be higher or lower than the control clock of the sensor array. When the modulation frequency is higher than the control clock of the sensor array by 2 times, all electro-optical conversion signals can be completely recovered based on Nyquist Sampling Theorem. When the modulation frequency is lower than the control clock of the sensor array, that is, a speed of the modulation frequency is slower than the control clock of the sensor array, the sensor array does not have one complete electro-optical periodic signal in one cycle. However, since the electro-optical signal is sparse and meets the Compressed Sensing Theory, the complete signal restoration can still be realized by electro-optical sampling in less than one cycle.

Figure 5:
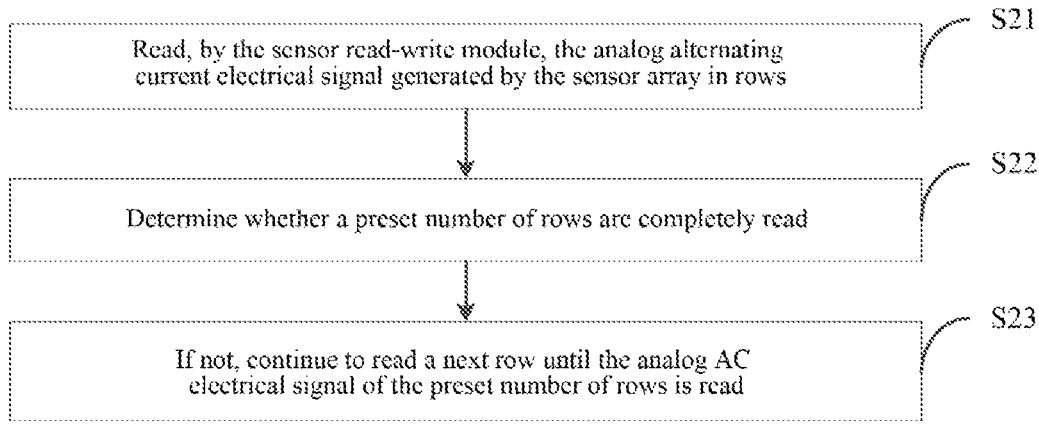
FIG. 5 is a schematic flowchart showing steps of data reading of the sensor read-write module provided by an embodiment of the disclosure.

Optionally, as shown in FIG. 5, the reading, by the sensor read-write module, the analog alternating current electrical signal generated by the sensor array, specifically includes the following steps of:

S21. reading, by the sensor read-write module, the analog alternating current electrical signal generated by the sensor array in rows;

S22. determining whether a preset number of rows are completely read; and

S23. if not, continuing to read a next row until the analog alternating current electrical signal of the preset number of rows is read.

After reading a preset number of m rows of data, there being n pieces of data in each row, which makes up a total of m×n pieces of data to be read, spectrum analysis is performed on the data of each pixel, the electrical signals corresponding to the modulation frequency are extracted, and subsequent image restoration is carried out.

Figure 6:
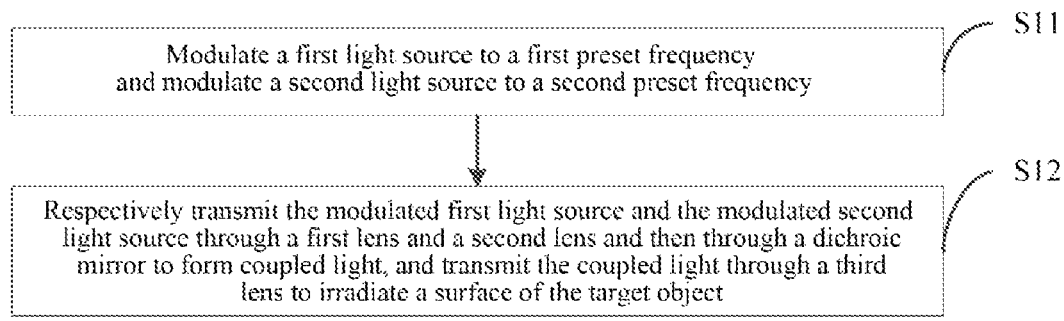
FIG. 6 is a flowchart showing steps of forming coupled light provided by an embodiment of the disclosure.

Optionally, as shown in FIG. 6, the method further includes the steps of:

S11. modulating the first light source to the first preset frequency and modulating the second light source to the second preset frequency; and S12. respectively transmitting the modulated first light source and the modulated second light source through the first lens and the second lens and then through the dichroic mirror to form coupled light, and transmitting the coupled light through the third lens to irradiate the surface of the target object.

It should be noted that this embodiment is mainly applied to the frequency modulation of two light sources, and the frequency modulation modes of the two light sources may be the same or different, and the first preset frequency and the second preset frequency are different.

Embodiments of the disclosure has the following beneficial effects: the imaging system of the embodiments of the disclosure includes the light source, the light source modulator, the objective lens, the sensor array, the sensor read-write module and the imaging display module, where the system modulates the light source to the preset frequency through the light source modulator and irradiates the modulated light source onto the surface of the target object; the optical signal diffusely reflected from the surface of the target object forms the analog alternating current signal in the sensor array after transmitting through the objective lens; the sensor read-write module amplifies the analog alternating current signal and extracts the target signal, and converts the target signal into the digital signal, and the imaging display module restores and displays the image of the target object according to the digital signal; the light source after modulated by the light source modulator irradiates on the surface of the target object, then the analog alternating current signal is formed on the sensor array, and the target signal is extracted from the analog alternating current signal by the sensor read-write module, thus reducing the influence of external ambient light on the imaging of the target object.

Figure 7:
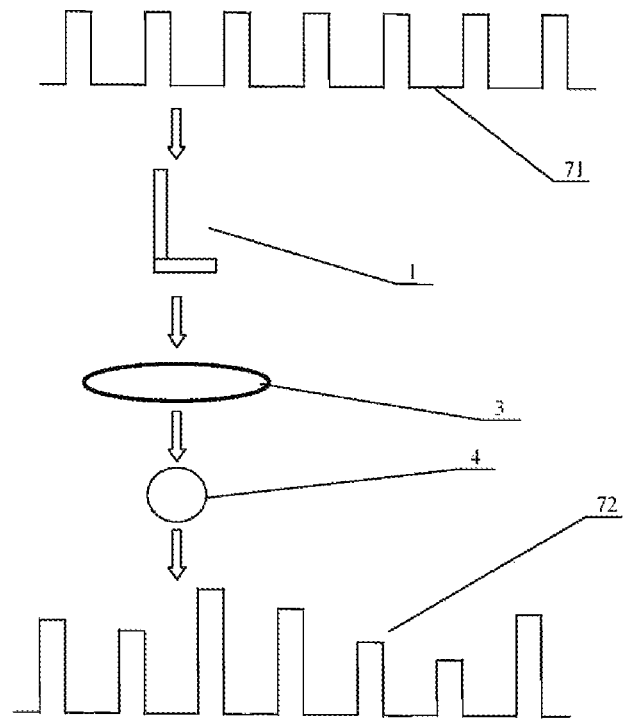
FIG. 7 is an explanatory diagram of modulating a frequency of a light source provided by an embodiment of the disclosure.

As shown in FIG. 7, the imaging process of the above system will be explained with specific embodiments. The modulated light source emits an optical signal 71 with a certain frequency. After the optical signal 71 irradiates the surface of a target object and undergoes diffuse reflection, which after transmitting through the objective lens 3 generates an electrical signal 72 on the array sensor 4. The frequencies of the optical signal 71 and the electrical signal 72 are the same. Because the background noise is white noise, the light source is modulated to filter the background noise and collect weak signals.

The foregoing describes the preferred embodiments of the disclosure in detail, but the disclosure is not limited to the embodiments, a person of ordinary skill in the art can make various equal deformations or replacements without departing from the gist of the disclosure, and these equal deformations or replacements shall all fall within the scope limited by the claims of the disclosure.

What is claimed is:

1. An imaging system, comprising a light source, a light source controller, an objective lens, a sensor array, a sensor reader-writer and an imaging display connected with the sensor reader-writer;

the light source controller is configured for modulating the light source to a preset frequency;

the objective lens is configured for imaging an optical signal reflected by a surface of a target object on the sensor array;

the sensor array is configured for converting the received optical signal into an analog alternating current electrical signal;

the sensor reader-writer is configured for amplifying the analog alternating current electrical signal and extracting a target signal, converting the target signal into a digital signal and storing the digital signal, and the sensor reader-writer is configured for reading the analog alternating current electrical signal generated by the sensor array in rows, determining whether a preset number of rows are completely read and if not, continuing to read a next row until the analog alternating current electrical signal of the preset number of rows is read;

the imaging display is configured for restoring and displaying an image of the target object according to the digital signal.

2. The imaging system of claim 1, wherein the light source is a common light source and the light source controller is a mechanical chopper.

3. The imaging system of claim 1, wherein the light source is a laser light source and the light source controller is a light source electrical controller.

4. The imaging system of claim 1, wherein the light source is a polarized light source and the light source controller is an electro-optical modulator.

5. The imaging system of claim 1, wherein the sensor reader-writer comprises a signal buffer unit, a phase sensitive detection unit, a high-pass filter unit and an analog-to-digital converter unit, the sensor array is connected with the analog-to-digital converter unit via the signal buffer unit, the phase sensitive detection unit and the high-pass filter unit sequentially, input signal of the phase sensitive detection unit further comprises a reference signal with a frequency identical to the preset frequency.

6. The imaging system of claim 1, wherein the light source comprises a first light source and a second light source, and the system further comprises a first lens, a second lens, a third lens and a dichroic mirror; and the first light source modulated by a first preset frequency and the second light source modulated by a second preset frequency respectively transmit through the first lens and the second lens and then transmit through the dichroic mirror to form coupled light, and the coupled light transmitting through the third lens is used for irradiating the surface of the target object.

7. An imaging method of the imaging system of claim 1, comprising the following steps of:

irradiating the light source modulated by the light source controller onto the surface of the target object;

reading, by the sensor reader-writer, an analog alternating current electrical signal generated by the sensor array, amplifying the analog alternating current electrical signal and extracting a target signal, and converting the target signal into a digital signal and storing the digital signal; and restoring and displaying, by the imaging display, an image of the target object according to the digital signal;

wherein the reading, by the sensor reader-writer, an analog alternating current electrical signal generated by the sensor array comprises the following steps of:

reading, by the sensor reader-writer, the analog alternating current electrical signal generated by the sensor array in rows;

determining whether a preset number of rows are completely read; and if not, continuing to read a next row until the analog alternating current electrical signal of the preset number of rows is read.

8. The imaging method of the imaging system of claim 7, further comprising a step of: setting a modulation frequency of the light source controller to the preset frequency.

9. The imaging method of the imaging system of claim 7, wherein the light source comprises a first light source and a second light source, and the system further comprises a first lens, a second lens, a third lens and a dichroic mirror; and wherein the method further comprises the steps of:

modulating the first light source to a first preset frequency and modulating the second light source to a second preset frequency; and respectively transmitting the modulated first light source and the modulated second light source through the first lens and the second lens and then through the dichroic mirror to form coupled light, and transmitting the coupled light through the third lens to irradiate the surface of the target object.

* * * * *